United States Patent [19]
Ohtsuka et al.

[11] Patent Number: 5,985,225
[45] Date of Patent: Nov. 16, 1999

[54] NITROGEN OXIDES REDUCTION CATALYST AND PROCESS FOR REDUCING NITROGEN OXIDES IN EXHAUST GAS

[75] Inventors: Hirofumi Ohtsuka, Hyogo; Takeshi Tabata; Osamu Okada, both of Osaka, all of Japan; Giuseppe Bellussi, Piacenza; Luigina Maria Flora Sabatino, San Donato Milanese, both of Italy

[73] Assignees: Osaka Gas Company Limited, Osaka, Japan; Eniricerche S.p.A., San Donato Milanese, Italy

[21] Appl. No.: 08/849,557

[22] PCT Filed: Oct. 4, 1996

[86] PCT No.: PCT/JP96/02891

§ 371 Date: Jul. 28, 1997

§ 102(e) Date: Jul. 28, 1997

[87] PCT Pub. No.: WO97/12663

PCT Pub. Date: Apr. 10, 1997

[30] Foreign Application Priority Data

Oct. 6, 1995 [JP] Japan ................................. 7-259829

[51] Int. Cl.$^6$ ........................... B01D 53/56; B01J 29/072
[52] U.S. Cl. ........................... 423/239.2; 502/66; 502/74; 423/213.5
[58] Field of Search ............... 423/239.2, 213.2, 423/213.5; 502/66, 74

[56] References Cited

U.S. PATENT DOCUMENTS

| | | |
|---|---|---|
| 3,308,069 | 3/1967 | Wadlinger et al. . |
| 4,491,637 | 1/1985 | Hartig et al. . |
| 4,867,954 | 9/1989 | Staniulis et al. ........................ 423/239 |
| 5,149,512 | 9/1992 | Li et al. ................................. 423/239 |
| 5,260,043 | 11/1993 | Li et al. ................................. 423/239.2 |
| 5,443,803 | 8/1995 | Mizuno et al. ....................... 423/213.2 |
| 5,451,385 | 9/1995 | Hansel et al. ........................ 423/213.5 |

FOREIGN PATENT DOCUMENTS

| | | |
|---|---|---|
| 0 603 900 | 6/1991 | European Pat. Off. . |
| 0 541 008 | 5/1993 | European Pat. Off. . |
| 0 652 040 | 5/1995 | European Pat. Off. . |
| 0 732 140 | 9/1996 | European Pat. Off. . |
| 0 739 651 | 10/1996 | European Pat. Off. . |
| MI93A2337 | 11/1993 | Italy . |
| 63-100919 | 5/1988 | Japan . |
| 63-283727 | 11/1988 | Japan . |
| 4-260441 | 9/1992 | Japan ................................. 423/239.2 |
| 5-220403 | 8/1993 | Japan . |
| 6-210171 | 8/1994 | Japan . |
| 2 238 784 | 6/1991 | United Kingdom . |
| WO 90/01365 | 1/1994 | WIPO . |

OTHER PUBLICATIONS

Li, et al., "Catalytic reduction of nitrogen oxides with methane in the presence of excess oxygen", *Applied Catalysis B: Environmental*, 1 (1992) Amsterdam, pp. L31–L40. (No Month).

67th CATSJ Meeting Abstract; vol. 33, No. 2, 1991.

Armor et al. "Catalytic Reduction of Nitrogen Oxides . . . ", Applied Catalysis B: Environ. vol. 1 No. 4 pp. L–31–L40, Dec. 15, 1992.

Catalytic reduction of nitrogen oxides with methane in the presence of excess oxygen: a review, J.N. Armor, Catalysis Today 26 (1995) 147–158.

The effect of $SO_2$ on the catalytic performance of Co–ZSM–5 and Co–ferrierite for the selective reduction of NO by $CH_4$ in the presence of $O_2$, Yuejin Li, John N. Armor, Applied Catalysis B: Envirnomental 5 (1995), L257–270, Air Products and Chemicals Inc.

Zeolite Molecular Sieves, Structures of Zeoloties, pp. 52–67.

Atlas of Zeolite Structure Types, W.M. Meier and D.H. Olson, 1992, pp. 450–469.

*Primary Examiner*—Wayne Langel
*Assistant Examiner*—Peter DiMauro
*Attorney, Agent, or Firm*—Merchant & Gould P.C.

[57] ABSTRACT

The present invention relates to a catalyst for reduction of nitrogen oxides in exhaust gas containing oxygen by hydrocarbons, which comprises cobalt-loaded zeolite not showing a Raman spectral band assignable to cobalt oxide ($Co_3O_4$).

9 Claims, 1 Drawing Sheet

NITROGEN OXIDES REDUCTION CATALYST AND PROCESS FOR REDUCING NITROGEN OXIDES IN EXHAUST GAS

FIELD OF THE INVENTION

The present invention relates to a catalyst for reducing nitrogen oxides in exhaust gas, and a process for said reduction. More particularly, the invention relates to a catalyst for reducing nitrogen oxides by hydrocarbons in exhaust gas containing an excessive amount of oxygen, and to a process for reducing nitrogen oxides in exhaust gas containing hydrocarbons and an excessive amount of oxygen.

BACKGROUND ART

Ammonia denitration has been used to remove nitrogen oxides (hereinafter referred to as "NOx") from gas containing oxygen exceeding in quantity the oxidizing capacity of the reductive gas, particularly exhaust gas from combustion at a higher air/fuel ratio than stoichiometric value. However, this process cannot be applied to small combustors, for the following two reasons. First, it requires an ammonia source. Secondly, "slip" of ammonia in excessive quantity can cause a secondary environmental pollution problem. Recently it was found, as disclosed in Japanese Patent Laid Open Sho 63-100919, that NOx can be selectively reduced by hydrocarbons on a zeolite catalyst ion-exchanged with Cu or the like metal.

However, if hydrocarbons having four or fewer carbons are used as a reducing agent, the above-mentioned catalyst provides low selectivity (molar ratio of hydrocarbons used in NOx reduction to total hydrocarbons consumed) and therefore low NOx conversion, in the presence of the water vapor always contained in ordinary exhaust gas.

Armor, et al. reported (Applied Catalysis B: Environmental, vol. 1, p. L31) that NOx can be selectively reduced by methane on Co ion-exchanged ZSM-5 (MFI zeolite). It is known, however, that the catalytic activity is also decreased in the presence of water vapor, so that the catalyst does not have a sufficient activity for practical use. Therefore, a catalyst which is effective even in the presence of water vapor is awaited.

As a solution to the above-mentioned conventional problems, Italian Patent Application No. MI93A2337 discloses a NOx reduction process which uses a BEA zeolite ion-exchanged with cobalt (Co-BEA).

The Co-BEA offers substantial improvement in catalytic activity and durability at low temperature in actual exhaust gas conditions (in the presence of water vapor etc.). However, if the concentrations of NOx and reductant hydrocarbon are low, the reaction rate decreases on this catalyst, and a sufficient NOx conversion for practical use cannot be achieved. Therefore, more active catalyst has been desired

PROBLEMS TO BE SOLVED BY THE INVENTION

Figure 1:
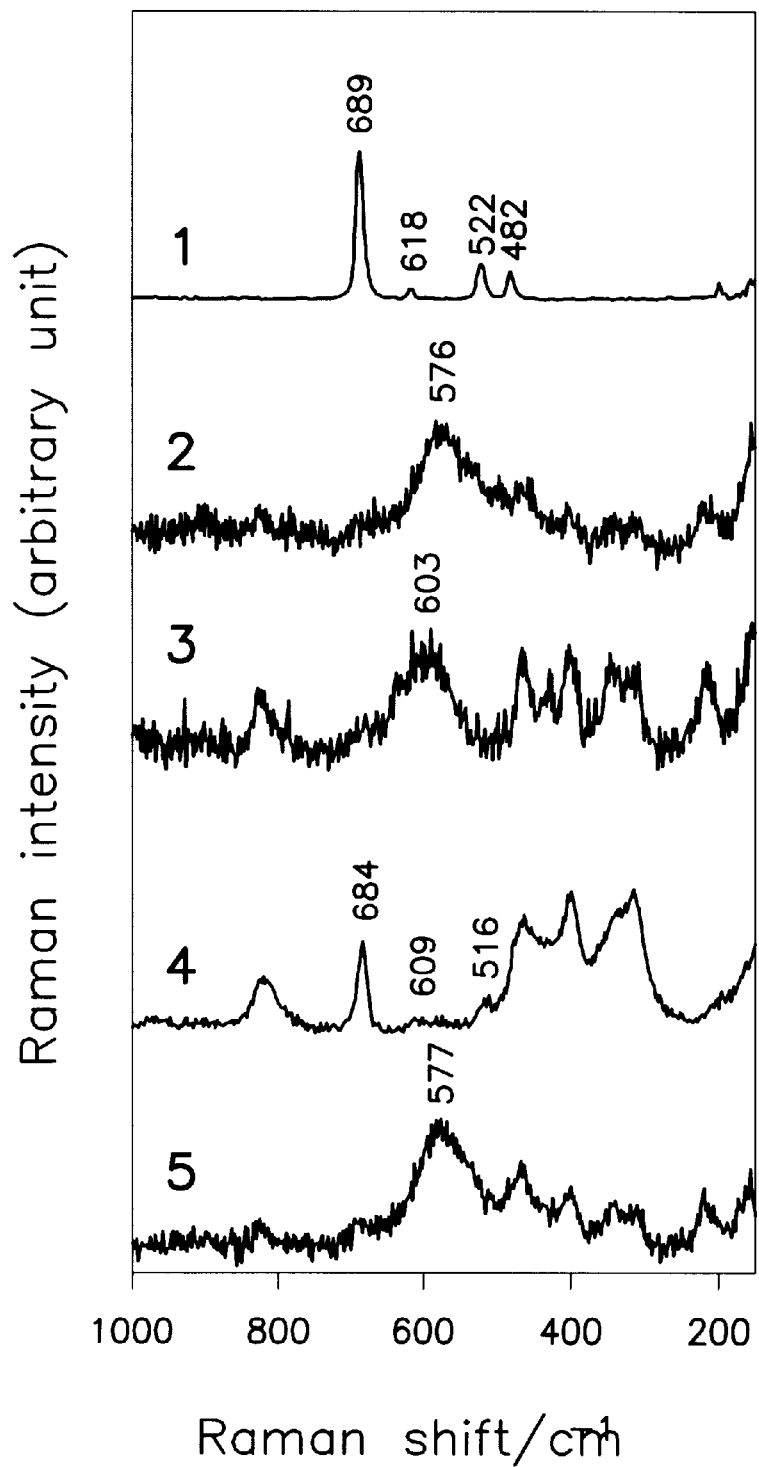
[FIG. 1] Raman spectra of $Co_3O_4$ and Co-loaded zeolites.
1 Raman spectrum of $Co_3O_4$
2 Raman spectrum of Co-BEA(1)
3 Raman spectrum of Co-BEA(2)
4 Raman spectrum of Co-BEA(3) (Comparative example)
5 Raman spectrum of Ni—Co-BEA

It is assumed that the catalytic activity of cobalt-loaded zeolite can be enhanced by increased loading of cobalt, which constitutes the active sites of the catalyst. However, if cobalt is loaded excessively, they will aggregate in the form of oxides, etc., clogging micropores in the zeolite and decreasing the catalytic activity. It has therefore been considered difficult to improve catalytic activity by increasing cobalt content while maintaining dispersion of cobalt.

To solve the above-mentioned problem, an object of the present invention is to provide a NOx reduction catalyst loaded with highly dispersed cobalt to secure high NOx conversion and high durability, even under low NOx concentration, in exhaust gas containing water vapor and relatively light hydrocarbons, such as exhaust gas for natural gas combustion. Another object of the invention is to provide a NOx reduction process using the above-mentioned catalyst.

Means to Solve the Problems

Through intensive study, the inventors found that catalysts which are not active despite high cobalt loading show the Raman spectral band that is assigned to cobalt oxide ($Co_3O_4$) (FIG. 1 (1)) at around 680 $cm^{-1}$ in the Raman shift (FIG. 1 (4)). However, in X-ray diffraction conventionally used for catalyst analysis, these catalysts show no diffraction line assignable to cobalt oxide. This indicates that NOx reduction activity is diminished substantially by the presence of a trace amount of cobalt oxide, which cannot be detected by conventional catalyst analysis. Comparison of catalytic activity result and Raman spectrum revealed that a catalyst containing cobalt oxide drops substantially in NOx reduction selectivity in the high temperature range, and that a catalyst showing a strong Raman spectral band assigned to cobalt oxide provides low NOx conversion in all temperature ranges. This drop in the NOx reduction selectivity in a high temperature range is presumably due to the high oxygen activation capacity of cobalt oxide, which promotes oxidation of hydrocarbons through reaction with oxygen. The low NOx conversion in all temperature ranges is presumably due to formation of a large amount of cobalt oxide, which clogs the micropores in the zeolite.

Further study revealed that if, through repetitive ion exchange operations in cobalt acetate solution, zeolite is loaded with cobalt to 90 to 150% in terms of ion exchange ratio, the resultant catalyst exhibits a characteristic band at around 570 to 600 $cm^{-1}$ in the Raman shift, but not a band assignable to cobalt oxide ($Co_3O_4$). It was also found that such a catalyst provides remarkably high NOx conversion with high selectivity, particularly in the relatively low temperature range from 350 to 450° C.

The inventors also found that, in zeolite loaded with highly dispersed cobalt, if one or some of Ni, Ca, Sr, Ba, La, Mn, Ag, In etc. are further loaded as promoters under inappropriate condition, the cobalt ions will aggregate, deactivating the catalyst.

The present invention has been made on the basis of these findings, to provide a NOx reduction catalyst comprising a cobalt-loaded zeolite which does not show the Raman spectral band that is assigned to $Co_3O_4$, for use in reducing nitrogen oxides by hydrocarbons in exhaust gas containing oxygen in excessive amount in terms of the stoichiometry with the reductive gas; and to provide a NOx reducing process using this catalyst.

The crystal structure of zeolite of the present invention may be of MFI or any other crystal type, insofar as it is heat-resistant. To secure proper intracrystalline diffusion, however, it is preferable that the zeolite have straight channels of oxygen 8-membered ring or larger section oriented in at least two different dimensional directions, said straight channels communicating with each other via oxygen 8-membered or larger ring micropores, the straight channels in at least one of said different directions being 10-membered or larger oxygen ring section. Example crystal types of zeolite having the above-mentioned channel structure are AFR, AFS, AFY, BEA, BOG, BPH, DAC, FER, GME, HEU, MEL, MFS and OFF. Preferable crystal types are BEA, BOG or MEL, in which straight channels are large in diameter. More preferable types are BEA or MEL, with which high-purity synthetic product can easily be obtained. The most preferable type is BEA, which has straight channels with oxygen 12-membered ring in section, in two different dimensional directions, said channels communicating with each other via micropores with 12-membered oxygen rings.

For the zeolite of the present invention, part of the silicon may be replaced with titanium etc., or part of the aluminum may be replaced with boron etc.; the zeolite of the present invention is not limited, insofar as it has ion exchange capacity.

Ion exchange capacity is important because it directly determines the number of active sites. The $SiO_2/Al_2O_3$ ratio (molar ratio) is a measure of ion exchange capacity. With a ratio of $SiO_2/Al_2O_3$ ratio above 100, the zeolite has insufficient ion exchange capacity, causing shortage of active sites. With a ratio of $SiO_2/Al_2O_3$ ratio below 10, on the other hand, the hydrophilicity of the zeolite increases, so that water vapor hinders the NOx reducing reaction more severely and excessive cations fill the channels, narrowing the passages and thereby impairing intracrystalline diffusion. Therefore, preferable $SiO_2/Al_2O_3$ ratio is between 10 and 100. Preferable $SiO_2/Al_2O_3$ ratio for securing stable crystal exists for each form of zeolite. For MEL zeolite, for example, the preferable $SiO_2/Al_2O_3$ ratio is between 20 and 100; that for BEA zeolite is between 10 and 50.

The zeolite of the present invention may be manufactured by any conventional method; for example, by well-known ordinary hydrothermal synthesis using a template. For example, MFI zeolite can be synthesized by the method disclosed in U.K. Patent No. 1402981, MEL zeolite by the method disclosed in U.S. Pat. No. 3,709,979, and BEA zeolite by the method disclosed in U.S. Pat. No. 3,308,069.

For the catalyst of the present invention, cobalt is loaded on the above-mentioned zeolite. Any method may be used for this loading, insofar as the resultant catalyst does not exhibit the Raman spectral band assigned to $Co_3O_4$. Ion exchange is preferable, since it hardly causes to form $Co_3O_4$. Ion exchange may be carried out by an ordinary method. For example, proton-, sodium- or ammonium-form zeolite is suspended in an aqueous solution in which water-soluble salt of cobalt is dissolved by quantity equivalent to the ion exchange capacity or in excess, of but not exceeding five times, the ion exchange capacity. In the aqueous solution, the zeolite is retained at between room temperature and about 80° C. for a period of an hour to about three days, to allow ion exchange to take place. The resultant zeolite is washed with water, dried, and calcined at temperature between 400 and 750° C. If the cobalt content in the aqueous solution is less than a quantity equivalent to the ion exchange capacity, the ion exchange rate of the cobalt may drop, resulting in poor catalytic activity. Excessive cobalt content, on the other hand, may promote $Co_3O_4$ formation. Ion exchange using cobalt carboxylate, such as cobalt formate or acetate, can easily produce a catalyst which is loaded with large amount of cobalt and does not show the Raman spectral band assignable to $Co_3O_4$. It is more preferable to carry out the ion exchange in pH 5 to 7 aqueous solution of 0.01 M to about 1 M cobalt carboxylate containing cobalt in quantity equivalent to the ion exchange capacity or in excess of, but not exceeding about five times, the ion exchange capacity, and after washing with water and filtration, repeat the ion exchange at least once more in renewed aqueous solution. Here, carboxylate concentration lower than 0.01 M would be uneconomical because a large quantity of aqueous solution would be required. A carboxylate concentration higher than 1 M could promote formation of $Co_3O_3$. An aqueous solution with a pH value below than 5 would decrease the ion exchange rate, and one with a pH value above than 7 could promote $Co_3O_4$ formation.

According to the present invention, cobalt loading is not limited, insofar as $Co_3O_4$ is not formed by such a large quantity as observed in the Raman spectrum. However, if cobalt loading is excessive, significant amount of cobalt ions fill micropores and channels, hampering diffusion of reactive molecules. Cobalt loading should preferably be 200% or less in terms of ion exchange rate, more preferably between 90% and 150%, with which remarkable catalytic activity and selectivity are secured, with the characteristic band of 570 to 600 $cm^{-1}$ observed in the Raman spectrum. Here, the ion exchange rate is the percentage of the molar number of loaded cobalt, multiplied by the charge of cobalt ion (+2), in the molar number of Al.

The catalyst of another embodiment of the present invention comprises a cobalt-loaded zeolite which carries at least one metal selected from the group consisting of Ni, Ca, Sr, Ba, La, Mn, Ag and In, and which does not show the Raman spectral band assignable to cobalt oxide ($Co_3O_4$). The cobalt-loaded zeolite of the first embodiment of the invention provides sufficiently high NOx conversion even under the condition of low NOx concentration. However, the cobalt-loaded zeolite further loaded with at least one of the above-mentioned metals may provide still higher NOx conversion, depending on the exhaust gas condition. The above-mentioned metal(s) on the cobalt-loaded zeolite may be loaded by any method, insofar as $Co_3O_4$ is not formed in such a large quantity as observed in the Raman spectrum; the metal(s) may be loaded by impregnation using aqueous solution of the metal salt(s), or by simultaneous ion exchange with cobalt is loaded on the zeolite. To suppress the formation of $Co_3O_4$ seen in the Raman spectrum, however, it is preferable to load cobalt by ion exchange on the zeolite, fix it on the zeolite by calcination at 400 to 750° C., and then impregnate above-mentioned metal(s) into the cobalt-loaded zeolite using aqueous solution of formate or acetate of the metal(s). The metal loading is not limited if $Co_3O_4$ is not formed in such a quantity as observed in the Raman spectrum. However, with too little loading, the metal(s) are not effective as additives. With excessive loading, the metal ions clog micropores in the zeolite. Therefore, metal loading should preferably be between 0.2 and 5 wt % of the cobalt-loaded zeolite, more preferably between 0.5 and 2 wt %.

The catalyst of the present invention may contain binder, and may be formed in pellet or honeycomb shape, or wash-coated on a refractory honeycomb support. According to the present invention, the catalyst contains zeolite which can be loaded with highly dispersed cobalt ions of low oxidation activity and high selectivity for NOx catalytic reduction, and it does not contain $Co_3O_4$, which can oxidize hydrocarbons by oxygen. Therefore, the catalyst of the present invention provides high NOx conversion in a wide temperature range, with high activity at low temperature, and with minimum decrease in selectivity at high temperature.

The NOx reduction process according to the present invention is a process to selectively reduce NOx in exhaust gas containing hydrocarbons and an excessive amount of oxygen, using a catalyst comprising cobalt-loaded zeolite described above.

Specifically, the NOx reduction process is executed by allowing the above-mentioned catalyst to contact exhaust gas containing NOx, hydrocarbons, and oxygen in quantity exceeding the oxidizing capacity of the coexisting reductive gas. The conditions for this reduction process are not limited, insofar as the process uses a catalyst comprising cobalt-loaded zeolite which does not show the Raman spectrum band assignable to $Co_3O_4$. The process is usually operated at a temperature between 300 and 600° C., preferably between 350 and 500° C., with a gaseous hourly space velocity (GHSV) between 2,000 and 100,000 $h^{-1}$, preferably between 5,000 and 30,000 $h^{-1}$. Operating temperature lower than 300° C. would result in insufficient catalytic activity; higher than 600° C. would cause early deterioration of the catalyst. GHSV lower than 2,000 $h^{-1}$ would cause high pressure loss, and higher than 100,000 $h^{-1}$ would result in poor NOx conversion.

The hydrocarbons mentioned in the present invention refer to a wide variety of hydrocarbons, including olefins such as ethylene, and paraffins such as propane. Preferably, they should be aliphatic hydrocarbons containing two to five carbons. Aromatic hydrocarbons are not preferable because the catalyst of the present invention has low oxidization activity for hydrocarbons. With aliphatic hydrocarbons containing about six or more carbons, the advantageous features of the present invention cannot be utilized since the diffusion rate of the hydrocarbons is low. Sufficient NOx conversion may not be attained with methane, which has low reactivity at temperatures lower than 400° C.

The NOx concentration of the exhaust gas to which the reduction process of this invention can be applied is not limited. The hydrocarbon concentration in terms of methane (THC) required for reduction of NOx is, normally, from ½ to 10 times the NOx concentration. That is, the hydrocarbon concentration required for reduction of 10 to 5,000 ppm NOx is 5 ppm to 5%. If hydrocarbon content in exhaust gas is not sufficient, an appropriate amount of hydrocarbon may be added to the exhaust gas to attain desired NOx conversion. The NOx reduction process of the present invention uses a catalyst comprising zeolite loaded with a large quantity of highly dispersed cobalt ions serving as the active sites. It therefore secures high NOx conversion even under low NOx concentration condition, which is unfavorable in view of the reaction rate.

If the oxygen concentration in exhaust gas is excessively low, oxidation of NO, which is the first stage of the reaction, does not occur. The oxygen concentration should preferably be 0.5% or higher, more preferably 3% or higher. Although there is no upper limit of oxygen concentration, oxygen concentration higher than that of air is not preferable since unexpected explosive combustion can be caused. However, since on the catalyst used in the NOx reduction process of the present invention Co ions having low activity for hydrocarbon oxidation is highly dispersed for a long time, the catalytic selectivity hardly drops in exhaust gas with high oxygen concentration.

Exhaust gas may also contain other components, such as $H_2O$, $CO_2$, CO, $H_2$ and sulfur oxides (hereinafter referred to as SOx). The NOx reduction process of the present invention is particularly suitable for use in exhaust gas containing water and other substances considered to hamper the reaction for selective catalytic reduction using hydrocarbons. The process of this invention is also suitable for removing NOx from exhaust gas produced by combustion of natural gas in which hydrocarbons having four or fewer carbons account for 90% or more of the entire hydrocarbons in terms of methane.

Since the NOx reduction process of the present invention uses hydrocarbons to remove NOx, hydrocarbons in the exhaust gas are also removed. An oxidation catalyst may be installed downstream of the catalyst of the present invention, if necessary, to oxidize remaining CO, hydrocarbons etc.

EXAMPLES

The present invention will be described in detail below, with reference to examples. These examples are not intended to limit the scope of the present invention.

Example 1

BEA zeolite was prepared by the following method. Sodium aluminate, sodium hydrate, silica sol, tetraethylammonium hydrate, and water were mixed for a $SiO_2/Al_2O_3$ ratio of 20. The mixture was then heated while stirring for 20 hours in an autoclave at 160° C., to effect crystallization. The resultant solids were filtrated, washed with water, dried at 150° C., and calcined at 550° C. for 5 hours. The $SiO_2/Al_2O_3$ ratio of the BEA zeolite (Na form) thus obtained was 18.4.

150 g of this BEA zeolite was suspended in 3-liter aqueous solution of 0.2 M cobalt acetate, to conduct ion exchange for 5 hours at 60° C. After filtration and washing with water, ion exchange procedure was repeated again under the same conditions as above. The resultant Co ion-exchanged zeolite was washed with water, dried, and calcined for 5 hours in air at 550° C., to obtain Co-BEA (1) catalyst. The cobalt-ion exchange rate of this catalyst was 126%.

Example 2

BEA zeolite with a $SiO_2/Al_2O_3$ ratio of 22.3 was prepared by the method disclosed in U.S. Pat. No. 3,308,069. 20.0 g of this BEA zeolite (Na form) was suspended in 1-liter aqueous solution of 0.03 M cobalt acetate, to conduct ion exchange for 5 hours at 60° C. After filtration and washing with water, ion exchange was conducted for 15 hours at 60° C. using 160 ml aqueous solution of 0.2 M cobalt acetate. After filtration and washing with water again, ion exchange was conducted again for 5 hours at 60° C. in 160 ml aqueous solution of 0.2 M cobalt acetate. The resultant Co ion-exchanged zeolite was washed with water, dried, and calcined to obtain Co-BEA (2) catalyst. The cobalt content of this catalyst was 4.0 wt %, with a Co ion exchange rate of 97%.

Comparative Example 1

BEA zeolite with a $SiO_2/Al_2O_3$ ratio of 22.3 was prepared by the method disclosed in U.S. Pat. No. 3,308,069. 80 g of this BEA zeolite (Na form) was suspended in 400 ml aqueous solution of 0.08 M cobalt acetate, to conduct ion exchange for 5 hours at 60° C., and then dried for 5 hours at 110° C. 60 g of the resultant zeolite was suspended in 300 ml aqueous solution of 0.11 M cobalt acetate, to perform ion exchange again for 5 hours at 60° C., followed by filtration and washing with water. 40 g of the resultant zeolite was further subjected to 5-hour ion exchange at 60° C. in 300 ml aqueous solution of 0.11 M cobalt acetate, then washed with water, dried, and calcined at 550° C. The cobalt content of the BEA zeolite at this stage was 3.0%, with a cobalt-ion exchange rate of 72%. 20 g of this BEA zeolite was suspended in aqueous solution of cobalt acetate for cobalt impregnation, then dried for 5 hours at 120° C., and calcined for 5 hours in air at 550° C., to obtain Co-BEA (3) catalyst. The cobalt content of this catalyst was 4.8%, with a cobalt-ion exchange rate of 128%.

Example 3

BEA zeolite prepared according to the process disclosed in U.S. Pat. No. 3,308,069 was suspended in 2 liter aqueous solution dissolving 150 g cobalt acetate, and stirred for 5 hours at 60° C., followed by filtration and washing with water. This ion exchange procedure was repeated total three times. The resultant cobalt ion-exchanged zeolite was calcined at 550° C. 110 g of thus obtained Co-BEA was added to 200 ml aqueous solution dissolving 4.779 g nickel acetate. After drying at 100° C. for 18 hours and calcination at 550° C., Ni—Co-BEA was obtained. The $SiO_2/Al_2O_3$ ratio of this catalyst was 17.5, the cobalt content was 4.56% with a cobalt-ion exchange rate of 102%, and the nickel content was 1.04%.

Example 4

Raman Spectrum Measurement

Raman spectrum was measured for the above-mentioned catalysts of Examples 1 to 3 and Comparative Example 1,2, as well as for cobalt oxide ($Co_3O_4$) for reference. Cobalt oxide was purchased from Kanto Chemical Co., Ltd. (Tokyo). It was pressed into a thin disk and calcinated at 500° C. before measurement. Measurement was made in air, using 514.5 nm radiation from an argon ion laser as an excitation light source, in a back-scattering configuration. FIG. 1 shows the measured result. For the Co-BEA (3) catalyst (FIG. 1-(4)) of Comparative Example 1, a spectral bands well agreed in wavenumber and intensity ratio with that of cobalt oxide (FIG. 1-(1)) were observed at 684 $cm^{-1}$, 516 $cm^{-1}$ etc., indicating the formation of cobalt oxide. On the other hand, for the Co-BEA (1) of Example 1 (FIG. 1-(2)) and the Co-BEA (2) of Example 2 (FIG. 1-(3)), no spectral band assignable to cobalt oxide was observed. An strong band was observed between 570 and 600 $cm^{-1}$ for these catalysts. For the nickel impregnated sample, the Raman spectrum of Ni—Co-BEA shows the strong band at about 580 $cm^{-1}$. However, none of this and other bands are assignable to cobalt oxide($Co_3O_4$).

Example 5

Catalytic Activity Test

Each of the catalysts obtained in Examples 1 to 3 and Comparative Example 1 and 2 was formed into pellet which was crushed and sieved to obtain 1 to 2 mm particles. The particles were calcined for 9 hours at 500° C. to prepare test sample. Four milliliter of the sample was packed in a stainless steel reaction tube (14 mm in inside diameter). While test gas of the composition specified in Table 1 was allowed to flow at a rate of 1 liter/min (GHSV=15,000 $h^{-1}$) through this reaction tube, the gas composition at the outlet of the reaction tube was measured by a chemiluminescence NOx meter and a gas chromatograph.

TABLE 1

| NO = 500 ppm | $H_2$ = 660 ppm |
| $C_3H_8$ = 1000 ppm | $CO_2$ = 6% |
| $O_2$ = 10% | $H_2O$ = 9% |
| CO = 1000 ppm | He balance |

Table 2 gives the catalytic activity (NOx and propane conversion) of each catalyst at 400 and 500° C. The NOx and propane conversions were calculated from the NOx and propane concentrations at the inlet and the outlet of the reaction tube using the following equations:

$$NOx\ Conv.\ (\%) = \frac{Outlet\ N_2\ Conc.\ (ppm) \times 2}{Inlet\ NO\ Conc.\ (ppm)} \times 100$$

$$C_3H_8\ Conv.\ (\%) = \frac{Inlet\ C_3H_8 - Outlet\ C_3H_8\ Conc.\ (ppm)}{Inlet\ C_3H_8\ Conc.\ (ppm)} \times 100$$

TABLE 2

| Catalyst | NOx Conversion ($C_3H_8$ Conversion) (%) | |
|---|---|---|
| | 400° C. | 500° C. |
| CO-BEA(1) | 90.3 (98.7) | 76.3 (100) |
| Co-BEA(2) | 79.0 (100) | 63.9 (100) |
| Co-BEA(3) | 67.2 (90.4) | 20.7 (100) |
| Ni—Co-BEA | 92.6 (98.0) | 90.3 (100) |

As is clear from Table 2, Co-BEA (1) of the present invention provides far higher activity than Co-BEA (3), although cobalt loadings on these two catalysts are almost the same. This indicates that high catalytic activity can be attained by avoiding formation of cobalt oxide.

Co-BEA (2) and Co-BEA (3) have the same $SiO_2/Al_2O_3$ ratio. However, the former catalyst, with a smaller amount of cobalt, which is active metal, provides higher NOx conversion than the latter, indicating that increased cobalt loading by impregnation etc. results in lower NOx reduction activity if cobalt oxide is formed.

Effect of the Invention

According to the present invention, since the catalyst is loaded with cobalt which has low hydrocarbon oxidation activity, it provides high selectivity for NOx reduction. In addition, the zeolite used for the catalyst of the present invention can be loaded with a large amount of highly dispersed cobalt ions without causing clogged micropores, which would hamper the diffusion of reactant molecules, or without forming cobalt oxide, which would decrease catalytic selectivity by promoting oxidation of hydrocarbons by oxygen. Therefore, the catalyst of the present invention provides higher NOx conversion in the wider temperature range compared to the conventional catalysts.

We claim:

1. A catalyst for reduction of nitrogen oxides in an exhaust gas containing oxygen in an excess amount with respect to the chemical equivalence of the reductive gas based on hydrocarbons, the catalyst comprising a cobalt-loaded zeolite wherein the Co/Al molar ratio is greater than 0.5 and in the Raman spectrum of the cobalt-loaded zeolite a ratio of intensity of the 689 $cm^{-1}$ band to that of zeolite framework bands between 300 and 600 $cm^{-1}$ is less than 0.07.

2. The NOx reduction catalyst according to claim 1 wherein the cobalt-loaded zeolite is further loaded with at least one metal selected from the group consisting of Ni, Ca, Sr, Ba, La, Mn, Ag and In.

3. The NOx reduction catalyst according to claim 1, wherein the zeolite is loaded with cobalt by means of ion exchange with cobalt carboxylate.

4. The NOx reduction catalyst according to claim 2 wherein the metal selected from the group consisting of Ni, Ca, Sr, Ba, La, Mn, Ag and In is loaded on the zeolite using carboxylate salt thereof.

5. The NOx reduction catalyst according to claim 1, wherein the zeolite is of BEA type.

6. The NOx reduction catalyst according to claim 3, wherein the $SiO_2/Al_2O_3$ molar ratio of the zeolite is between 10 and 50.

7. A process for reducing nitrogen oxides in an exhaust gas, comprising:

reducing nitrogen oxides with hydrocarbons in the exhaust gas, the exhaust gas containing oxygen in an excess amount compared to the chemical equivalence of the reductive gas, in the presence of a nitrogen oxide reduction catalyst based on hydrocarbons, the catalyst comprising a cobalt-loaded zeolite wherein the Co/Al molar ratio is greater than 0.5 and in the Raman spectrum of the cobalt-loaded zeolite a ratio of intensity of the 689 $cm^{-1}$ band to that of zeolite framework bands between 300 and 600 $cm^{-1}$ is less than 0.07.

8. The NOx reduction process according to claim 7, wherein cobalt-loaded zeolite further loaded with at least one metal selected from the group consisting of Ni, Ca, Sr, Ba, La, Mn, Ag and In is used.

9. The NOx reduction process according to claim 7 wherein 90% or more of the hydrocarbons in terms of methane contained in the exhaust gas are hydrocarbons having four or smaller number of carbons.

* * * * *